US008635244B2

(12) United States Patent
Shapiro et al.

(10) Patent No.: US 8,635,244 B2
(45) Date of Patent: *Jan. 21, 2014

(54) SYSTEM AND METHOD FOR STRUCTURED NEWS RELEASE GENERATION AND DISTRIBUTION

(75) Inventors: Eileen C. Shapiro, Cambridge, MA (US); Steven J. Mintz, Saddle River, NJ (US)

(73) Assignee: NewsGems LLC, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/538,586

(22) Filed: Jun. 29, 2012

(65) Prior Publication Data

US 2012/0272127 A1 Oct. 25, 2012

Related U.S. Application Data

(63) Continuation of application No. 10/112,570, filed on Mar. 29, 2002, now Pat. No. 8,214,386, which is a continuation-in-part of application No. 10/108,239, filed on Mar. 25, 2002, now Pat. No. 7,035,848, which is a continuation of application No. 09/641,460, filed on Aug. 18, 2000, now Pat. No. 6,363,390, and a continuation-in-part of application No. 09/469,207, filed on Dec. 21, 1999, now Pat. No. 6,289,350, which is a continuation-in-part of application No. 09/378,686, filed on Aug. 20, 1999, now Pat. No. 6,370,535.

(60) Provisional application No. 60/209,528, filed on Jun. 5, 2000, provisional application No. 60/211,284, filed on Jun. 13, 2000.

(51) Int. Cl.
*G06F 17/30* (2006.01)

(52) U.S. Cl.
USPC .................. 707/770; 707/803; 715/225

(58) Field of Classification Search
USPC ............... 707/770, 803; 715/225; 705/26.1; 709/219
See application file for complete search history.

(56) References Cited

U.S. PATENT DOCUMENTS

| 4,276,597 A | * | 6/1981 | Dissly et al. ................... 1/1 |
| 5,418,951 A | * | 5/1995 | Damashek ...................... 1/1 |
| 5,537,586 A | * | 7/1996 | Amram et al. .................. 1/1 |
| 5,553,216 A | * | 9/1996 | Yoshioka et al. ............. 715/210 |
| 5,893,109 A | * | 4/1999 | DeRose et al. ................. 1/1 |
| 5,999,939 A | * | 12/1999 | de Hilster et al. ............. 1/1 |
| 6,005,597 A | * | 12/1999 | Barrett et al. ................ 725/46 |
| 6,038,573 A | * | 3/2000 | Parks ........................ 715/202 |

\* cited by examiner

*Primary Examiner* — Cam Truong
(74) *Attorney, Agent, or Firm* — Sunstein Kann Murphy & Timbers LLP

(57) ABSTRACT

A method of providing a news release to a user is disclosed. In one embodiment, the method comprises: providing access to the user, over a network, to data stored in a computer-readable digital storage medium; and structuring the data provided to the user over the network so that the user experiences a news release having a plurality of sections, the sections including a headline, a summary, key points, and a network address.

22 Claims, 33 Drawing Sheets

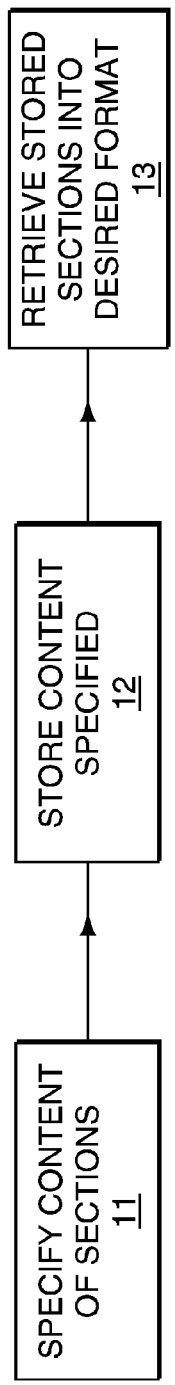
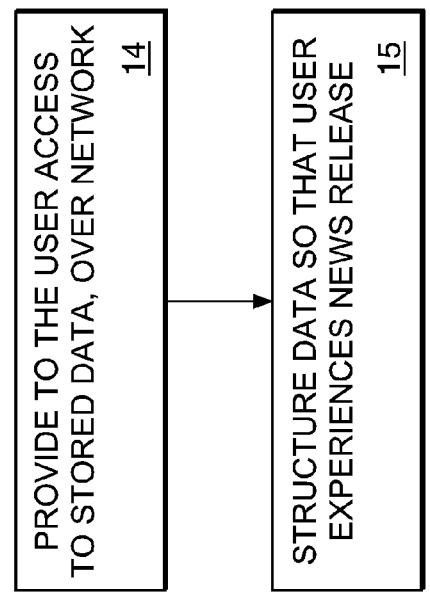

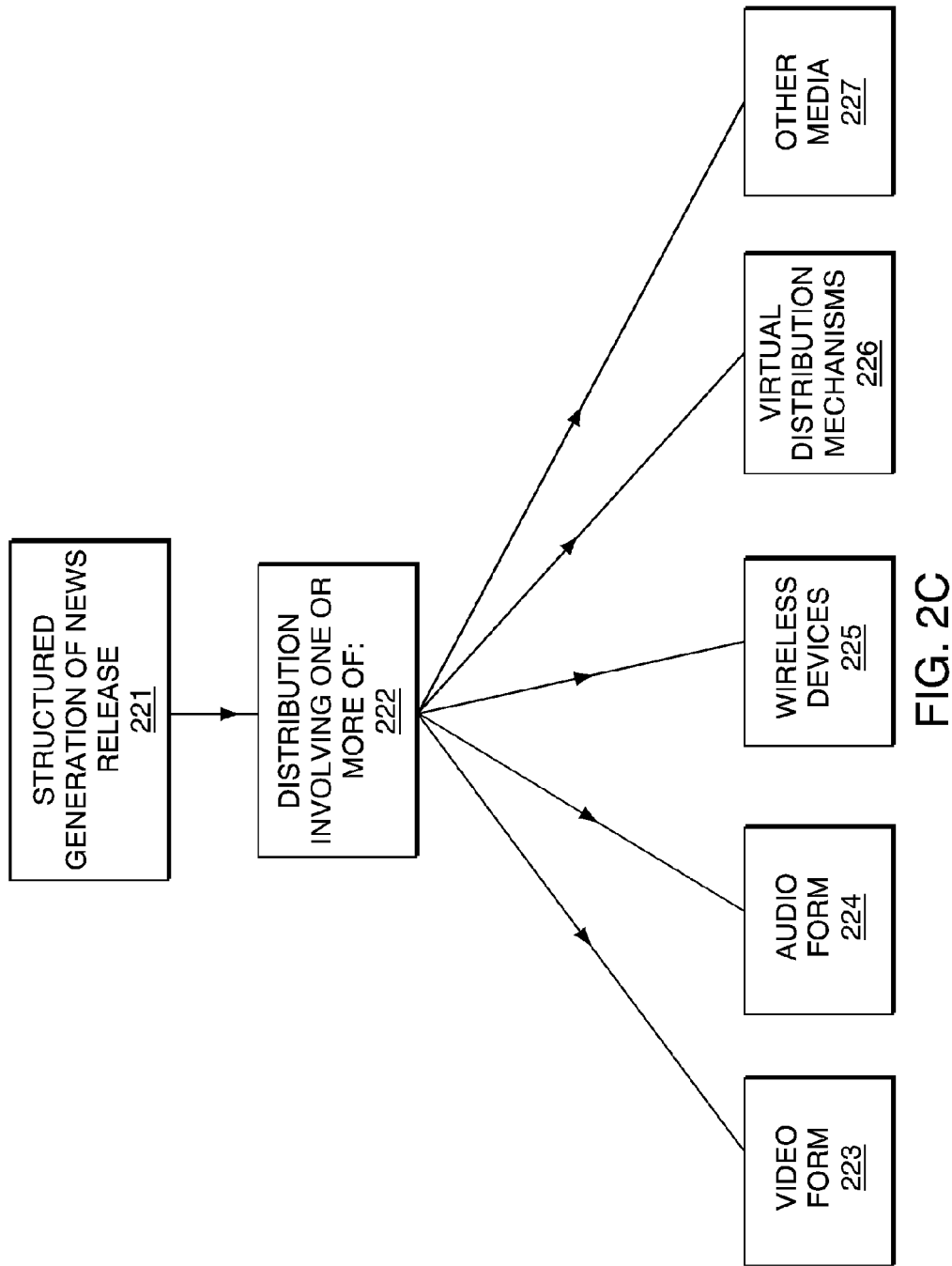

Welcome to NewsGems.com

NewsGems.com is an online communication service that will deliver your message in a patent pending "fast scan" format via e-mail to a highly-targeted exclusive database of interested opt-in recipients on the Net.

NewsGems.com was designed for use by traditional marketers of products and services, new websites/net businesses, traditional non-web businesses that want to target customers, and individuals prompting ideas or books. NewsGems.com can help you:

- Publicize the launch of new products and services
- Introduce a new business
- Disseminate important information about your company
- Build brand awareness and name recognition
- Announce the publication of new books To help you shape your news story, we use our NewsWizard, an interactive interview to develop key information about your news opportunity. You will enter information into media-friendly forms which we provide. You'll find guidelines, hints, and examples to help you along.

Whether you're an advertising novice or an experienced advertising executive, we designed NewsGems.com as a cost-effective and highly-efficient way to meet your customers and tell your story.

Please click here to see an example of a NewsGems.com release

FIG. 5

Promoting a business opportunity
An example of an e-release follows

| | |
|---|---|
| HEADLINE | NEWSGEMS.COM SUPERCHARGES ONE-TO-ONE MARKETING |
| IN BRIEF | NewsGems.com provides a new way to collect and disseminate news that is easier, faster, less costly and more targeted than traditional advertising and public relations; and has patent pending and copyright protection. |
| HIGHLIGHTS | • Better for Users: NewsGems.com provides individuals with an easy way to track subjects of interest due to its patented and copyrighted "easy-scan" format, hyperlinks for additional information, and e-mail dissemination based on self-reported interest.<br>• Better for Companies: NewsGems.coms' patent-pending template-based process for creating news releases provides a disciplined, low cost way for companies to distill their messages and then target messages to their target audience.<br>• Better for Aggregators: NewsGems.com provides aggregators with an opportunity to collect content and fees. |
| WHO WILL CARE | ○ Individuals who want an easy way to track subjects of interest<br>○ Businesses that can benefit from targeting individuals<br>○ Aggregators that seek content traffic, and additional revenue streams |
| RELEASE DATE | RELEASE DATE -- 10/1/99 |
| KEY WORDS | ○ One-to-one marketing; web-based advertising; web based p.r.; content aggregators |
| CONTACT INFO | CONTACT INFO ○ Weblink(s): www.NewsGems.com<br>○ Full press release: Not applicable<br>○ Other Available Materials: Presentation package from Steve Mintz and Eileen Shapiro<br>○ Contacts(s): Eileen Shapiro, eshapiro@hillcrestinc.com or 617-495-0020 or Steven J. Mintz smintz3088@AOL.com, or 201-825-8164 |

THE NEWSGEMS PROCESS     BACK TO WELCOME SCREEN

FIG. 6

The NewsGems.com Submission Process

First we'll ask you to enter your contact and credit card information and a few details about your news opportunity. Your credit card will not be charged until you have completed the entire submission process and have clicked on the "Yes, process my submission" button. After you've provided this initial information you'll be given a choice of continuing online or downloading our forms and completing them later. The rest of the submission process is as follows:

1. Draft a HEADLINE for your NewsGems.com submission

2. Draft your IN BRIEF statement which summarizes your news

3. Draft up to 3 HIGHLIGHTS which support or enhance the news

4. Identify the WHO WILL CARE which identifies which readers will be interested in your news 5. Indicate the TIME SENSITIVITY of your news 6. Provide KEY WORDS that will help filter your news to appropriate recipients 7. Provide CONTACT INFORMATION so the recipient can take action through hyperlinks, return e-mails etc.)

If we accept your submission, our marketing professionals will proofread and copyedit your material and send it to you for your final approval. We'll then distribute your news story to our highly-targeted database of recipients who have indicated that they are interested in news like yours and are willing to accept e-mail communication.

LEGAL DISCLAIMER: WE RESERVE THE RIGHT TO REJECT ANY APPLICATION FOR NEWSGEMS.COM'S DISTRIBUTION SERVICES FOR ANY REASON. ALSO WE CANNOT GUARANTEE COVERAGE.

<u>I accept the forms and want to begin the Submission Process</u>

FIG. 7

Contact Information

Please fill-out your contact and credit information

YOU WILL NOT BE BILLED UNTIL YOU HAVE SUBMITTED YOUR E-RELEASE LATER IN THE PROCESS.

| Field | |
|---|---|
| First Name | |
| Middle Initial (optional) | |
| Last Name | |
| Title (optional) | |
| Company Name | |
| Address | |
| Address | |
| City | |
| State | |
| Zip/Postal Code | |
| Country | |
| Email | |
| Telephone | |
| Fax (optional) | |
| Web Site (optional) | |

Click here for Next Screen

FIG. 8

Payment Information

Credit Card Type     Visa ▼

Card Number

Name on Card (if different from name in contact information section)

Billing Information (if different from address in contact information.)

NOTE: YOUR CARD WILL NOT BE BILLED UNTIL THE END OF THIS PROCESS, AND YOU CLICK ON THE "I ACCEPT" BUTTON

Begin the NewsGems Process by WRITING A HEADLINE     Download forms and fill out off line

FIG. 9

CREATING A HEADLINE

In creating a headline, the guideline is:

- *What is newsworthy about your message?*

Purpose     Grab attention and quickly determine level of interest

Guidelines
- 8 to 10 words
- Captures the essence of the subject matter
- Intrigues, informs or surprises the recipient
- Capture the tone and spirit of your message
- Establishes credibility Click here for hints for writing an Effective HEADLINE Click here for examples of Ineffective and Effective HEADLINES

Enter Your HEADLINE here

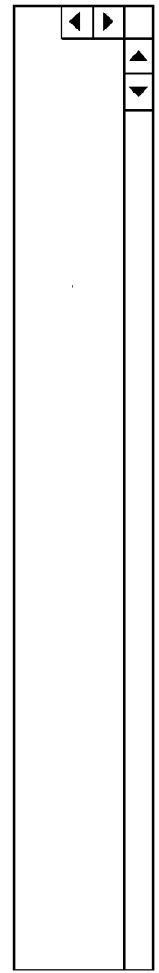

Now let's move on to the IN BRIEF SUMMARY of the opportunity.

FIG. 10

Hints for Writing an Effective HEADLINE

- A headline is a punchy, descriptive phrase you see above a newspaper article

- Start with a phrase from your story that captures the essence in a way that makes people want to know more.

- Whittle down that phrase into a headline. Use punchy words and eliminate extraneous terms (including unnecessary prepositions, qualifiers, and descriptors). Rearranging words might help.

- To the extend you can, remove the jargon and "alphabet soup" acronyms. Restate the concept in a layperson's terms.

Examples of effective and ineffective HEADLINES

Write a HEADLINE

FIG. 11

Examples of Ineffective and Effective HEADLINES

*Example 1:*

Weak:
    Why:

Stronger:
    Why:

*Example 2:*

Weak:
    Why:

Stronger:
    Why:

*Example 3:*

Weak:
    Why:

Stronger:
    Why:

<u>Hints for writing effective HEADLINES</u>    <u>Write a HEADLINE</u>

FIG. 12

Writing an IN BRIEF Summary

Purpose   Provides thumbnail summary and its implications for the receiver

Guidelines
- One or two short sentences
- No more than 40 words
- Specific and attention getting
- Concise and to the point Click here for hints for writing an IN BRIEF Summary Click here for examples of effective and ineffective IN BRIEF Summaries Enter Your IN BRIEF Summary Now let's move on to writing the HIGHLIGHTS of the opportunity.

FIG. 13

Hints for Writing an Effective IN BRIEF Summary

- You might think of your NewsGems.com submission summary as a brief description of your news, or the "scoop".

- Narrow down your story to one or two compelling sentences (with 25 word total).

- Focus on the most important angle of your story.

- Keep your writing sharp and jargon-free.

Examples of Effective and Ineffective IN BRIEF Summaries

Write a IN BRIEF Summary

FIG. 14

Examples of Effective and Ineffective IN BRIEF Summaries

*Example 1:*

Weak:
    Why:

Stronger:
    Why:

*Example 2:*

Weak:
    Why:

Stronger:
    Why:

*Example 3:*

Weak:
    Why:

Stronger:
    Why:

| Hints for writing an IN BRIEF Summary | Enter your IN BRIEF Summary |
|---|---|

FIG. 15

WRITING THREE HIGHLIGHTS

Purpose   Answer the question—why should I be interested in this?

Guidelines
- Two to three statements that support the HEADLINE and entice the reader; for example
  - Answer question: "Why is this news?"
  - Present facts or statistics or other evidence to show why your story is important or interesting
- The statements don't necessarily have to relate to each other. —*BUT MUST SUPPORT THE HEADLINE*
- 30 to 40 words in total per highlight Click here for hints on writing HIGHLIGHTS Click here for examples of effective and ineffective HIGHLIGHTS Enter your First Highlight below Enter your Second Highlight below Enter your Third Highlight below Now let's move on to the WHO WILL CARE about your opportunity

FIG. 16

Hints for Writing HIGHLIGHTS

1. Your Highlights should reflect the big, important themes

2. The Highlights should support the headline

3. Be careful of marketing slogans or fluff; screen these out immediately

4. Avoid using jargon and buzzwords to keep your messages easy to understand

Examples of Effective and
Ineffective HIGHLIGHTS

Write the
HIGHLIGHTS

FIG. 17

Examples of Effective and Ineffective HIGHLIGHTS

*Example 1:*

Weak:
    Why:

Stronger:
    Why:

*Example 2:*

Weak:
    Why:

Stronger:
    Why:

*Example 3:*

Weak:
    Why:

Stronger:
    Why:

Hints for writing HIGHLIGHTS      Write the HIGHLIGHTS

FIG. 18

Writing a WHO WILL CARE statement

Purpose   To help describe which individuals will be interested in the news

Guidelines
- Identify one or several groups of people who would be interested in your story
- Be specific about describing each intended audience
- Explain why each of these groups will be interested in your news
- Maximum 40 words Click here for hints for writing WHO WILL CARE descriptions Click here for examples of effective and ineffective WHO WILL CARE descriptions Enter your description of WHO WILL CARE Now let's move on to the TIME SENSITIVITY of your news.

FIG. 19

Hints for Writing WHO WILL CARE descriptors

Beware of hyperbole or overly broad statements. "Everyone would be interested in my story" or even "all women will be fascinated by this news" usually is not believable.

Beware of identifying too narrow an audience. "Boys between the ages of 10 and 12 who enjoy fly fishing" is probably too narrow a definition. Here a slightly broader target audience might be appropriate. "Preteenaged boys who are interested in outdoor activities"

Examples of effective and ineffective WHO WILL CARE descriptions

Write a WHO WILL CARE descriptions

FIG. 20

Examples of Effective and Ineffective WHO WILL CARE Descriptions

*Example 1:*

Weak:
    Why:

Stronger:
    Why:

*Example 2:*

Weak:
    Why:

Stronger:
    Why:

*Example 3:*

Weak:
    Why:

Stronger:
    Why:

| Examples of effective and ineffective WHO WILL CARE descriptions | Write a WHO WILL CARE description |
|---|---|

Page 1/2

FIG. 21

TIME SENSITIVITY

If your NewsGems.com story relates to an event (for example a product launch, holiday, breaking news, current event or special day), we need to know the start date and end date of the event. Please describe the event and give us the start and end dates.

Describe the event

Give us the start and end dates

- Start date (mm/dd/yy) __/__/__
- End date (mm/dd/yy) __/__/__

If your story is related to an event, do you want us to:

☐ Send Your submission with the next dispatch or

☐ Hold until (mm/dd/yy) __/__/__

Click here to suggest KEY WORDS

FIG. 22

Choosing KEY WORDS

To help target your NewsGems.com submission, choose from the key words below which best describe your opportunity.

```
first
second
third
```

If there are other key word not included on the list above, please include them in the box below.

Click here to move to Contact Information

FIG. 23

Contact Information

After an individual receives a NewsGems.com submission in which they have interest, it is especially powerful for that individual to be able to learn more about the opportunity.

Please indicate below what types of additional information or opportunities for action are available:

__website: URL__

__e-commerce purchase: URL__

__press kit: URL__

__sample

__Other

Click here to review your completed NewsGems.com submission

FIG. 24

REVIEW OF COMPLETED RELEASE

Review your completed NewsGems.com release below. Make any editing changes required. After you are satisfied with the release, move to submit it below.

HEADLINE

IN BRIEF

HIGHLIGHTS

WHO WILL CARE

TIME SENSITIVITY

KEY WORDS

CONTACT INFORMATION

Click here to submit completed NewsGems.com release and authorize credit card payment

FIG. 25

That's It!

You'll receive an email with 24 hours informing you that your story submission has been reviewed and any suggested edits will be provided Thank you for using NewsGems.com!

FIG. 26

[example of a format]

*HEADLINE IN CAPS*

IN BRIEF:

HIGHLIGHTS:

--#1:

--#2:

--#3:

SHELF LIFE:

TAKE ACTION:

QUOTABLES:

KEY WORDS:

*CONTACT INFO*

--WEBLINK: [if yes, provide address]

--OTHER AVAILABLE MATERIALS: [list materials, and how obtain]

--CONTACT(S):

--FEEDBACK NOW:

FIG. 27

*CREATING DOOM-LOOPS IS BIG BUSINESS TODAY*

IN BRIEF: In her new book — *The Seven Deadly Sins of Business: Freeing the Corporate Mind from Doom-loop Thinking* — Eileen Shapiro shows the business beliefs, assumptions and hopes that drive even the best managers into making terrible decisions.

HIGHLIGHTS:

--#1: The book is full of examples that show what the sins are, how they work, and why managers fall prey to them. Shapiro is also available to apply this framework to companies currently in the news.

--#2: Shapiro is the author of the best selling, Fad Surfing in the Boardroom. And, as with Fad Surfing, this book also includes a new "Devil's Companion to the Fad Surfer's Dictionary."

--#3: The Observer, a leading London newspaper, calls this book "brilliant." John Scully says: "If I could go back in time and take only business book with me; this is it."

WHO WILL CARE: Anyone who wants to help make sure that his or her organization isn't accidentally headed to corporate hell in a Seven Deadly Sins handbasket.

SHELF LIFE: evergreen; book published 1 June 1999

KEY WORDS/TOPICS: Leadership, Empowerment, Management Training, Business Strategy, Corporate Performance

---

*CONTACT INFO*

—WEBLINK:
***website for this book is www.fadsurf.com
***this website was designed exclusively for fun—and to use cutting edge web technologies in a series of experiments (interactive games, dancing devil.gif)

—OTHER AVAILABLE MATERIALS?:
***full press pack—including full press release, author bio, sample interview, summary points for the book
***contact: Eileen Shapiro at eshapiro@hillcrestinc.com —CONTACT(S):
***author:Eileen Shapiro, eshapiro@hillcrestinc.com, or 617-495-0020

---

FEEDBACK NOW:

FIG. 28

SYSTEM AND METHOD FOR STRUCTURED NEWS RELEASE GENERATION AND DISTRIBUTION

CROSS-REFERENCE TO RELATED APPLICATIONS

This application is a continuation of application Ser. No. 10/112,570, filed Mar. 29, 2002, entitled "System and Method for Structured News Release Generation and Distribution," which is a continuation-in-part of application Ser. No. 10/108,239, filed Mar. 25, 2002, now issued as U.S. Pat. No. 7,035,848.

Application Ser. No. 10/108,239 is a continuation of application Ser. No. 09/641,460, filed Aug. 18, 2000, now issued as U.S. Pat. No. 6,363,390, which claims the benefit of provisional application Ser. No. 60/209,528, filed Jun. 5, 2000, and of provisional application Ser. No. 60/211,284, filed Jun. 13, 2000.

Application Ser. No. 10/108,239 also is a continuation-in-part of application Ser. No. 09/469,207, filed Dec. 21, 1999, now issued as U.S. Pat. No. 6,289,350, which is in turn a continuation-in-part of application Ser. No. 09/378,686, filed Aug. 20, 1999, now issued as U.S. Pat. No. 6,370,535.

Application Ser. No. 10/108,239 also is a continuation-in-part of application Ser. No. 09/378,686, filed Aug. 20, 1999. The disclosures of all of the aforementioned applications are incorporated herein by reference in their entireties.

TECHNICAL FIELD

The present invention relates to systems and methods for structured generation and distribution of news releases, including over networks and particularly the Internet.

BACKGROUND ART

The prior art is familiar with applications available over the World Wide Web for providing an individual with news stories that have been automatically selected according to pre-specified criteria. On the other hand, the preparation of news stories and, more particularly, of news releases, is generally an operation that involves human effort of a kind that has not significantly changed in decades. While there are aids, such as word processing programs, that can be invoked to speed the motion of words selected by the writer onto a text-storing medium such as paper, the actual selection of the words in a news release usually involves the same exercise of creative effort and editorial judgment that has been required since the format of a news release was first developed. Indeed, part of the difficulty in writing a news release involves developing a suitable approach to whatever happens to be the subject of the release. In this sense, a typical prior art news release is friendly neither to the creator, owing to the work involved in creating the news release, nor to the reader, owing to the effort involved in gleaning information from it.

It is not surprising, therefore, that the writing of news releases is usually left to specialists in marketing and public relations departments of businesses or to independent public relations consultants.

SUMMARY OF THE INVENTION

In a first embodiment of the present invention, a method of providing a news release to a user comprises:
providing access to the user, over a network, to data stored in a computer-readable digital storage medium; and
structuring the data provided to the user over the network so that the user experiences a news release having a plurality of sections, the sections including:
(i) a headline;
(ii) a summary;
(iii) key points; and
(iv) a network address.

In further related embodiments, a method further comprises permitting selection and retrieval of the data provided to the user, according to user-specified search criteria, so that the user may select among a plurality of news release experiences. The news release experiences may include exposure to promotional information. Providing the experience of a news release may include providing content that has been selected, for at least one of the plurality of sections of the news release, from among a plurality of different possible choices of content for the at least one section of the news release, the selection based upon characteristics of a target audience of the news release. The news release experience may include exposure to an advertisement relating to an information category identified based upon the user's previous response, over the network, to at least one other advertisement.

In another embodiment according to the invention there is provided a method of facilitating a transaction conducted, at least in part, electronically over a network, wherein the transaction takes place in a plurality of stages among a plurality of parties, at least one of the parties being a user. The method includes: providing to at least one party, in at least one stage of the transaction, an experience of a news release in accordance with the method of the first embodiment above, the news release selected based upon the subject matter of the transaction. At least one of the parties may be a merchant.

In a further embodiment according to the invention, a method of providing promotional information to a user over a network comprises:
providing to the user over the network an experience of a news release in accordance with the method of the first embodiment described above,
the news release experience including exposure to promotional information and provided to the user only upon a determination that a selected marketing tier for the promotional information is of equal or higher hierarchical marketing tier level than a predetermined level,
the marketing tier for the promotional information selected from among a plurality of marketing tiers each characterized by a different hierarchical level of customization to user preferences. The promotional information may include a promotional e-mail.

In another embodiment according to the invention, a method of conducting market research comprises forming a profile of a user's product or service preferences based upon the user's choices of products from among a plurality of product or service options provided to the user as news release experiences in accordance with the method of the first embodiment described above.

Further related embodiments include systems for implementing the above-described methods.

BRIEF DESCRIPTION OF THE DRAWINGS

The foregoing features of the invention will be more readily understood by reference to the following detailed description, taken with reference to the accompanying drawings, in which:

FIG. 1A is a block diagram of an embodiment of a method in accordance with the present invention for generating and distributing a news release.

FIG. 1B is a block diagram of an embodiment of a method in accordance with the present invention for providing a news release to a user.

FIG. 2C is a block diagram of an embodiment of a method in accordance with the present invention for distributing a structured news release by one or more of a variety of distribution media.

FIGS. 5 and 6 illustrate HTML pages that may be used as pages of a website according to an embodiment of the invention.

FIGS. 7 through 24 illustrate templates in the form of HTML pages prompting a user for input of content of the news release in the sections of contact information, payment information, headline, "in brief" summary, highlights, who will care, time sensitivity, key words, and information about further opportunities; these may be used as pages of a website according to an embodiment of the invention.

FIG. 25 shows an HTML page, that may be used as a page of a website according to an embodiment of the invention, and that allows a user to review the completed news release, authorize credit card payment, and submit the release.

FIG. 26 shows an HTML page that may be used as a page of a website according to an embodiment of the invention, and that informs the user about the next stage in the news release process according to an embodiment of the invention, and thanks the user.

FIG. 27 shows partitioning of a news release into a number of sections, in accordance with an embodiment of the invention.

FIG. 28 shows an example of a news release utilizing the sections of the embodiment of FIG. 27.

DETAILED DESCRIPTION OF SPECIFIC EMBODIMENTS

Figure 2A:
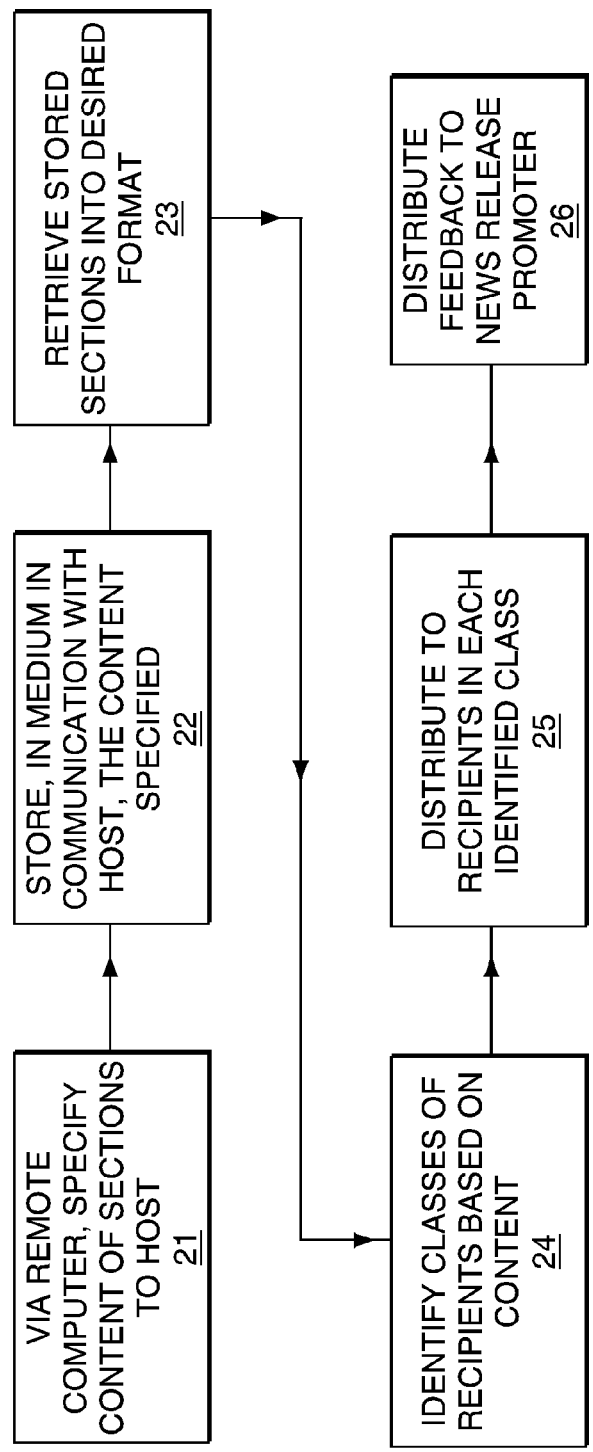
FIG. 2A is a block diagram of an embodiment of a method in accordance with the present invention for generating and distributing a news release over a network.

FIG. 1A is a block diagram of an embodiment of a method in accordance with the present invention for generating a news release. In this embodiment, three activities are involved. As shown in item 11, first there is specified the content of sections of the news release. As shown in further detail below, the news release is conveniently partitioned into a number of sections. An example of such a partitioning is shown in FIG. 27. The sections include (among other things) for example the headline, a summary, key points, and a release date. The sections of the news release are ordered in a manner consistent with a desired format for the news release. The content specified for each section is in item 12 stored in a suitable digital storage medium. Finally, as shown in box 13, the news release is assembled by retrieving from the digital storage medium each of the stored sections. The retrieval is managed so as to provide a news release in the desired format. One of the benefits of this embodiment is the possibility of providing a highly structured environment in which to create the news release. This structured environment permits persons without substantial experience in marketing or public relations to create an effective news release in an efficient manner. Similarly, the format provided by embodiments of the present invention permits readers of the news release to scan quickly and efficiently the information presented in the release. Readers may thereby quickly determine their level of interest, desire for follow-up materials, and desire to communicate feedback to the news release promoter.

FIG. 1B is a block diagram of a related embodiment for providing a news release to a user which includes, in box 14, providing access to the user, over a network, to data stored in a computer-readable digital storage medium. In box 15, the data provided to the user over the network is structured so that the user experiences a news release having a plurality of sections, the sections including a headline, a summary, key points, and a network address. Such a news release experience may be generated by systems analogous to those described herein.

Figure 3A:
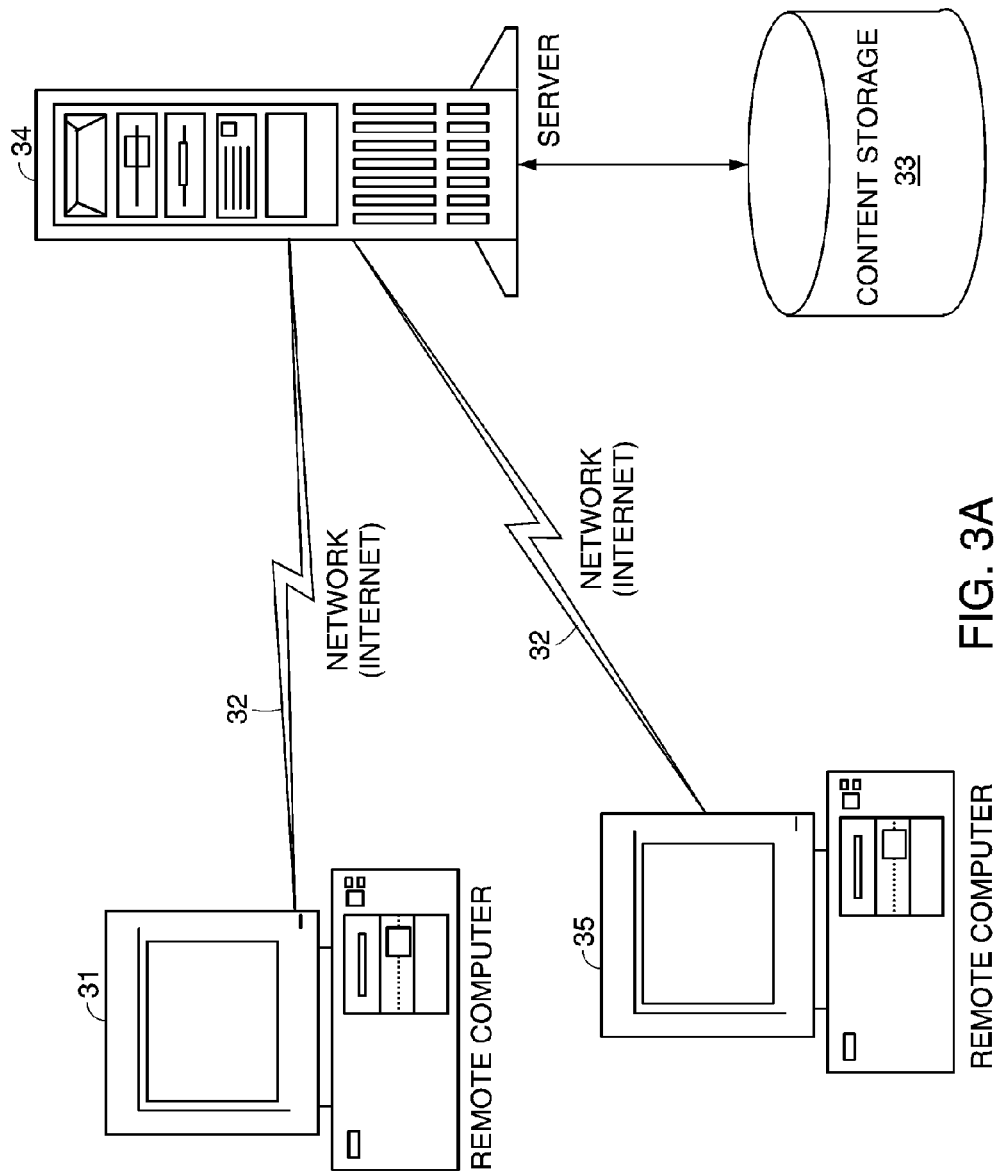
FIG. 3A is a diagram illustrating a system in accordance with the present invention for generating and distributing a news release over a network.

FIG. 2A is a block diagram of an embodiment of a method in accordance with the present invention for generating and distributing a news release over a network. In this embodiment it is assumed that the content of the news release will be specified via a remote computer 31 as shown in FIG. 3A, which is in communication over a network 32 with a host computer 34. The host computer 34 is here implemented as a server and is in communication with a digital storage medium 33 for storing (among other things) news release content. The network 32 may be implemented as the Internet, and in particular the World Wide Web. In this specific embodiment, the host computer 34 provides HTML pages for access by a remote computer such as computer 31 by means of which may be entered appropriate news release content. Shown in box 21 is the first activity of this embodiment, which in a manner analogous to the activity in box 11 of FIG. 1 includes specifying the content of sections of the news release, but in this case the content is entered via remote computer 31 and the content is communicated over the network 32 to the host computer 34. In box 22, the host computer 34 causes the content to be stored in the digital storage medium 33 which may be realized, for example, as a hard disk drive. After the content has been stored in box 23, the news release is assembled by retrieving from the storage medium each of the stored sections in a manner consistent with the desired format.

In a further embodiment, there may be included further activities associated with distribution of the news release. In particular, in box 24, there are automatically identified classes of recipients of the news release based on content of at least one of the sections in the news release. In one embodiment, information in the section KEY WORDS/TOPICS is used to identify the classes. Alternatively, for example, it is known in the art of intelligent content management to identify key words in text and to use these key words to characterize the content of the text. See for example, U.S. Pat. No. 5,799,304 (Miller, "Information evaluation"); U.S. Pat. No. 5,649,186 (Ferguson, "System and method for a computer-based dynamic information clipping service"); U.S. Pat. No. 5,537,586 (Amram et al., "Enhanced apparatus and methods for retrieving and selecting profiled textural information records form a database of defined category structures"); U.S. Pat. No. 5,418,951 (Damashek, "Method of retrieving documents that concern the same topic"); and U.S. Pat. No. 5,384,703 (Withgott et al., "Method and apparatus for summarizing documents according to theme"), which are hereby incorporated herein by reference. Such a characterization may be used to determine classes of recipients of the news release. In particular, it is within the scope of the present invention to utilize a list of recipients, wherein each recipient is placed in one or more classes according to the interests or other characteristics of the recipient. One major group of recipients in many applications for embodiments described herein is reporters. Reporters may be placed in classes according to the types of topics they cover, for example fashion, new technology, business leaders, and so forth. However, other groups are also possible recipients and may also be placed in classes according to interests or other characteristics. For example, business managers may be targeted for news releases depending on the nature of the businesses they manage. Consumers, too, may be interested in receiving information concerning specific kinds of new products. All of these groups may be treated as recipients and placed into appropriate classes. Accordingly, in step 24, there are automatically identified classes of recipients of the news release based on content of at least one of the sections of the news release. Thereafter, in box 25, there occurs the activity of distributing the news release to recipients of each identified class. In further embodiments, distribution of the news release is performed automatically and includes sending the news release as e-mail over the Internet. The e-mail may optionally include an attachment supplying additional information. Further information concerning the Internet and E-Mail is provided in the above referenced patents and, for example, in Gralla, *How the Internet Works* (Ziff-Davis Press, 1996), which is hereby incorporated herein by reference; see especially pages 44-49.

In a further embodiment, feedback provided by a recipient of the news release is provided to the news release's promoter as shown in box 26 of FIG. 2A. The feedback may include a variety of recipient responses to the news release; for example, questions, comments, reviews, or return opinions about the news release or collateral matters; or about the underlying products or services discussed in the news release; or about information contained in sources cited in the news release, including that contained in websites accessible by cited hyperlinks; or about samples of the underlying products or services. In one preferred embodiment, the feedback includes information as to which news release it responds to (since it may be only one of many news releases distributed), or includes information as to which promoter it responds to (since it may be one of many promoters on whose behalf news releases are distributed). It may also include information enabling further communication with the recipient who is the source of the feedback.

In a particular embodiment, server 34 of FIG. 3A receives the feedback as e-mail transmitted over network 32 from a recipient's remote computer 35. The server then provides the feedback as e-mail to the promoter's remote computer 31, over network 32. In an alternative embodiment, a recipient provides feedback directly to a promoter, for example as e-mail from computer 35 to computer 31. In an additional alternative embodiment, feedback is not provided directly to a promoter, but instead is provided to an intermediary agent of the promoter—for example, an advertising agency.

Figure 2B:
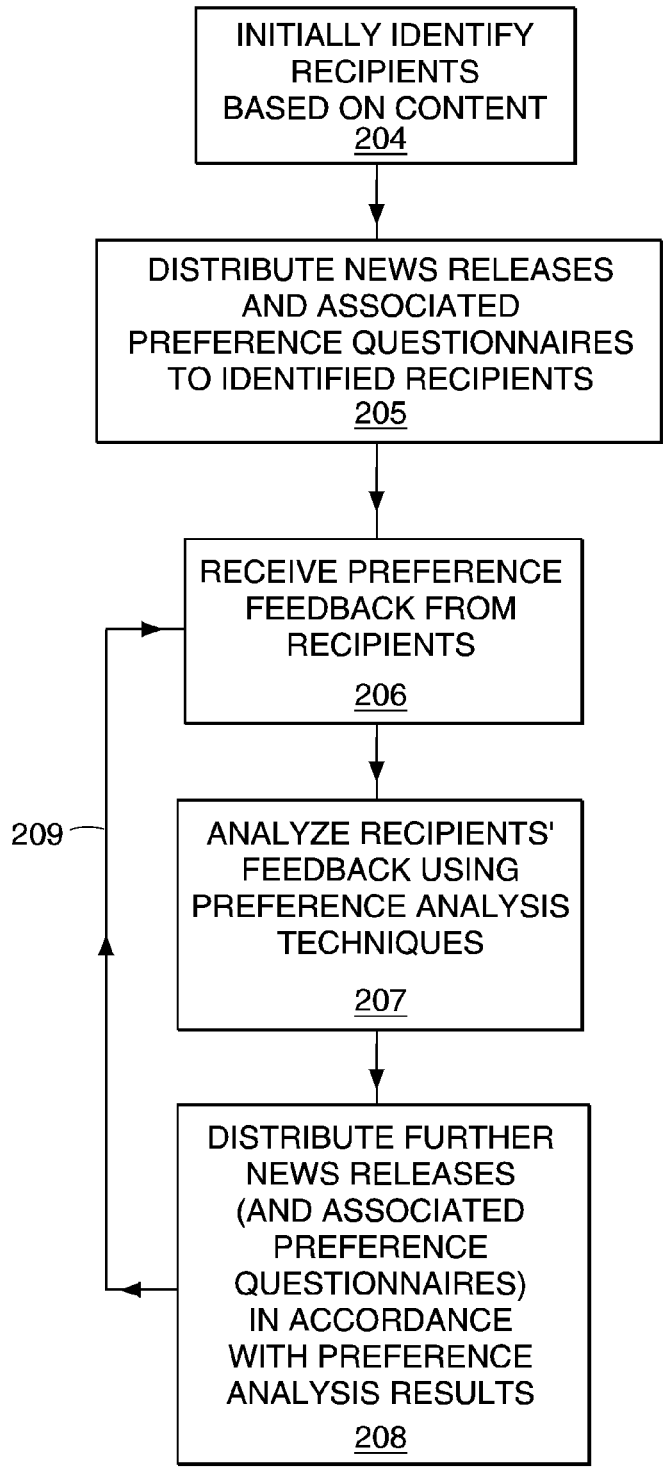
FIG. 2B is a block diagram of an embodiment of a method in accordance with the present invention for generating and distributing a news release utilizing preference analysis.

In another embodiment, summarized in the block diagram of FIG. 2B, identification of recipients of the news release is facilitated through the use of preference analysis techniques, such as collaborative filtering. In this embodiment, the initial steps of the embodiment of FIG. 2A are followed (steps 21-23). As in step 24 of FIG. 2A, classes of recipients (or individual recipients) are initially identified based on the content of the news release, for example by key word techniques (step 204 of FIG. 2B). Next, however, in step 205 of the embodiment of FIG. 2B, a ratings questionnaire or other preference questionnaire is distributed to each recipient, preferably accompanying the news release. The preference questionnaire elicits the recipient's degree of preference for the news release; for example, it may seek a recipient's rating of the news release on a numerical scale of 1 to 10. Each recipient's response to the preference questionnaire is then received along with other feedback on the news release, in step 206. The preference questionnaire may be implemented, in one embodiment, as an e-mail message, e-mail attachment, and/or HTML link that accompanies an e-mail news release. In this embodiment, the preference feedback can then be received by a computer, such as server 34 of FIG. 3A, as an e-mailed (or otherwise digitally transmitted) reply to the preference questionnaire.

Once the preference feedback has been received, the embodiment of FIG. 2B next (in step 207) comprises the step of analyzing the recipients' preference feedback using preference analysis techniques, such as collaborative filtering. Collaborative filtering techniques are disclosed in U.S. Pat. No. 6,064,980 of Jacobi et al, and U.S. Pat. No. 6,041,311 of Chislenko et al., the disclosures of which are hereby incorporated herein by reference. In one embodiment, a preference vector is maintained for each news release recipient, containing as elements the recipient's numerical rating of each news release. For each given news release recipient who has already rated news releases, a host system, such as server 34 of FIG. 3A, identifies groups of recipients who have the highest correlation of preference vectors with that of the given recipient, and who thus have similar tastes in news releases. This may be performed, for example, by evaluating the dot product of preference vectors of recipients and selecting a group of recipients having the highest results. Then, for each news release that the given recipient has not yet received, the system determines how highly it was rated by the selected group of recipients. Those releases that received high ratings by the selected group (for example, releases that received above a specified average numerical rating, or that received ratings which are relatively high when compared with those of other news releases that the given recipient has not yet received) are then distributed to the given recipient (step 208). Thus news releases may also be distributed to recipients in a way that accords with the preferences of other recipients having similar tastes. In this way, the likelihood that recipients enjoy the distributed news releases is increased. (It should be noted that embodiments of the invention are not limited to performing collaborative filtering in the particular fashion just described, but may also perform other methods of collaborative filtering, or other forms of preference analysis.)

Finally, in the embodiment of FIG. 2B, further preference feedback may be gained on distributed news releases, as shown by arrow 209 (back to step 206). Steps 206-208 are thus repeated, refining data on recipients' preferences for news releases, and thereby refining news release targeting.

In further embodiments according to the invention, news releases generated in a manner similar to those described herein may be distributed by a wide variety of distribution mechanisms. Referring to FIG. 2C, such embodiments according to the invention begin in step 221 with the structured generation of a news release in a fashion similar to those described in, for example, FIG. 1, 2A, 3B, or 4A-4C. Once the content for the news release is specified, stored, and retrieved into a desired format, the next step of the embodiment of FIG. 2C is to distribute the news release to recipients by one or more of a variety of distribution mechanisms (step 222).

For instance, the news release may be distributed in video form 223 or audio form 224. In these cases, the method of news release generation may itself involve the capture of video or audio data for one or more of the sections of the news release, in which case the video or audio data is then distributed as part of the assembled news release. Alternatively, data in video or audio form may be automatically generated based on a user's news release content, at the user's option, and subsequently distributed. In one embodiment, a user specifying news release content over the Internet may provide an instruction via a web page selection to convert the user's specified news release text to an audio voice signal, for subsequent distribution. Whether generated from text or audio/video input, the news release (or one or more sections thereof) may then be delivered to recipients in audio and/or video form. The news release may be delivered by e-mail, in a form that is readable by an audio or video player on a personal computer; but the delivery may also be to a variety of receiving devices. For example, the message may be delivered in audio or video format to a personal computer, Internet appliance, or wireless device.

News releases, whether distributed in text, audio, or video form, may also be distributed to or from wireless devices 225 in accordance with embodiments of the invention. Thus, for example, news release content, whether received from a wireless device or by other electronic means, may be retrieved into a desired format and distributed to wireless receiving devices.

News releases may also be distributed by virtual delivery mechanisms 226 in accordance with the embodiment of FIG. 2C. Thus, data corresponding to a news release (whether in text, audio, video, or other format) may be embedded in, or attached to, a virtual delivery mechanism for distribution to recipients. Such a mechanism is "virtual" in that it is created in, and accessible by, software; but it effectively functions like a delivery mechanism. As a particular example, a news release may be embedded in a virtual envelope (or "smart envelope") for distribution to recipients. These envelopes may then be easily forwarded by users, potentially leading to the development of virtual networks based on users' affinities and shared tastes. At the time of filing, such "smart envelopes" are marketed as Gizmoz™ on the World Wide Web at http://www.gizmoz.com. Gizmoz™ function like a mobile envelope that adjusts to any platform, and allow widespread replication to users in a (non-harmful) "viral" fashion. Embodiments according to the invention are not limited to this distribution mechanism, however, and may also be used with other virtual distribution mechanisms.

In accordance with the embodiment of FIG. 2C, news releases may also be transmitted by other media 227, which may be any one of a wide variety of electronic media. Additionally, the attachments to news releases may contain content from a variety of media, including, for example, audio media, video media, virtual delivery mechanisms (such as Gizmoz™ "smart envelopes"), or Java applets, in a fashion similar to those described above for the news releases themselves. The news releases may also be equipped with features that facilitate forwarding to other recipients. For example, a news release may contain a software "button" enabling a recipient to select the message for forwarding to another recipient by e-mail or by message delivery to a wireless device.

News releases may also be distributed, in accordance with the embodiment of FIG. 2C, at a higher level of aggregation than that of the individual news release. Thus, a user may receive a "meta-news release" that gives only the headlines (or other simple identifier), and possibly the "In Brief" sections, from each of a collection of different individual news releases. These releases are preferably organized by subject matter. For example, a user may receive a meta-news release on "This Week in Neurobiology," containing a collection of news release headlines related to neurobiology. Such headlines in a meta-news release preferably enable the reader of the meta-news release to access the corresponding individual releases. For example, each headline may have an HTML link to its associated individual news release.

It should also be noted that, while several references have been made herein to use of the HTML language to implement specific features of embodiments of the invention, embodiments according to the invention are not limited to using HTML, but may instead use any language providing the desired functionality, as will be understood by those of ordinary skill in the art in conjunction with the specification herein.

In accordance with a further embodiment of the invention, a user is provided with an electronic advertisement, in the format of a news release generated in a manner similar to those described herein. Such an electronic advertisement may be provided over a network, for example as an HTML page over the Internet, or in any other suitable language or network.

In one such embodiment, an electronic advertisement, formatted as a news release in accordance with embodiments described herein, is provided to a user upon a determination that the user is interested in purchasing a given category of products or services. For example, in one embodiment, a user indicates an intention of purchasing a product or service from a given category, by communicating over an electronic network. The embodiment detects the user's intention, identifies the category of the product or service, and provides the user, over the network, with a news release formatted in accordance with an embodiment of the invention, relating to the same category of products or services. A user's intention to purchase a product or service may be identified, for example, using an Expression of Purchase Intent (EPI) engine, such as one used, at the time of filing, at http://www.gator.com, the disclosure of which is hereby incorporated herein by reference.

In another, similar embodiment according to the invention, a user's interest in a given category of products or services is determined based upon the subject matter of an electronic search that the user conducts. Once the category of the user's search is identified, a news release in accordance with an embodiment of the invention, relating to the identified category, is provided to the user electronically over the network. An example of a website that identifies a user's interest based on a search category is found, at the time of filing, at http://www.go.com, the disclosure of which is hereby incorporated herein by reference.

In another embodiment according to the invention, an electronic advertisement in the format of a news release generated in a manner similar to those described herein is provided as a follow-up advertisement to a "teaser" electronic advertisement. For example, such a follow-up advertisement may be provided to a user after the user clicks on a banner advertisement on the Internet.

In a further related embodiment, such a follow-up advertisement may be provided to a user after the user accesses a customized advertisement. The follow-up advertisement may, for example, be provided after the user accesses a customized advertisement delivered over a network, such as the Internet or a wireless network; or after the user accesses a customized advertisement delivered over a broadcast system, such as a Digital Video Recorder (DVR) system, Interactive Television (ITV) system, or a Video-on-Demand system. At the time of filing, several companies provide such broadcast systems, which provide interactivity, preference engines, and interactive commercials; example systems include TiVo, Replay TV (of SONICblue, Inc.), Ultimate (of Microsoft Corp.), and Wink Interactive Television. The customized advertisement, which triggers the provision of a follow-up advertisement in the format of an embodiment of the present invention, may have been targeted or customized to the system's user by various known techniques for determining consumer preferences, including techniques of preference analysis.

In a further related embodiment, such a follow-up advertisement may be provided as part of a "digital insert" or "digital package insert," for example as part of an online billing statement, or a click-on addition to an online confirmation of an order. For example, a reader may be presented with a headline, and then click through to obtain such a follow-up advertisement for a related item.

In another embodiment according to the invention, a news release formatted in accordance with an embodiment described herein is provided as a targeted advertisement or e-mail (for example, an electronic promotion) that goes only to certain recipients based upon a targeting algorithm. For example, such a news release may be used with, or as part of, any software or technique used to target advertisements or other e-marketing materials. For example, Predictive Networks tracks and analyzes online behavior, and uses this data to customize advertisements to individual users; see http://www.predictivenetworks.com, the disclosure of which is hereby incorporated herein by reference. Similar techniques may be used based on patterns of keyboard and mouse usage, or based on remote control usage with an interactive television. Resulting data patterns ("profiles," "silhouettes," and "biometric user silhouettes") may be used to target advertisements.

In another embodiment according to an invention, a news release or advertisement formatted in accordance with an embodiment described herein is used with, or as part of, a recommendation engine, which targets the news release or advertisement based on the preferences of a target audience. Recommendation engine techniques may use collaborative filtering; however, other recommendation engine techniques may be used in accordance with embodiments of the invention.

In accordance with another embodiment of the invention, a news release formatted in accordance with an embodiment described herein is provided as a marketing-related e-mail with delivery tiers or profiled delivery. For example, such a method may provide promotional information to a user over a network, by providing the user with an experience of a news release in accordance with an embodiment of the invention. The news release is provided to the user only upon a determination that a selected marketing tier for the promotional information is of equal or higher hierarchical marketing tier level than a predetermined level. The marketing tier for the promotional information is selected from amongst a plurality of marketing tiers, each characterized by a different hierarchical level of customization to user preferences.

In a further embodiment according to the invention, a news release or advertisement formatted in accordance with an embodiment described herein is used in conjunction with a zero latency engine (ZLE) or other system or method that provides an almost instantaneous response to other transactions. In another embodiment, such a news release or advertisement is used with, or as part of, systems like and including DoubleClick's DART (Dynamic Advertising Reporting Targeting), an advertisement placement technology that DoubleClick is now also using to manage marketing e-mails. See U.S. Pat. No. 5,948,061 and http://www.doubleclick.com/us, the disclosures of which are hereby incorporated herein by reference. In addition, such a news release or advertisement may be archived, and used in response to search inquiries. Also, such a news release or advertisement may be provided in response to other information collected online. For example, vendor X could look at complaints on PlanetFeedback about vendor Y, and respond to the complainer with an e-mail in the format of a news release in accordance with an embodiment of the invention, advertising vendor X's products. See http://www.planetfeedback.com, the disclosure of which is hereby incorporated herein by reference.

In another embodiment according to the invention, a news release formatted in accordance with an embodiment described herein is provided as an electronic advertisement or e-mail that is not only targeted, but also customized. For example, the content may be auto-customized, with specific points in the format automatically customized based on other information (including from ZLE's or from any other database). Such an embodiment may be used in conjunction with personalization software or personalization platforms for marketers, and may be used to dynamically personalize an advertising message, or as part of optimized interactive marketing.

In another embodiment according to the invention, a news release formatted in accordance with an embodiment described herein is provided as an electronic advertisement or e-mail that is provided as part of a sampling/promotions service or another similar incentive program, such as those provided at FreeSamples.com, mypoints.com, and GetRelevant.com, the disclosures of which are hereby incorporated herein by reference; or as part of Customer Loyalty programs or systems; or with surveys or gift certificates.

In a further embodiment according to the invention, a news release or electronic advertisement formatted in accordance with an embodiment described herein is linked to a system (such as a website) with which a recipient registers as a member, or registers to purchase a product, or registers to take up a marketer's offer.

In another embodiment, such a news release or electronic advertisement is delivered in a Zaplet format, or any similar format in which an e-mail shell has an embedded link to a Web-like application, which is shared by recipients of an e-mail message. See http://www.zaplet.com, the disclosure of which is hereby incorporated herein by reference. The embedded links may, for example, come through the "Take Action" or "Feedback Now" portions of the format of a news release.

Such a news release or electronic advertisement may also be delivered as part of a "viral" marketing campaign, which may be fostered by a virtual delivery device such as Gizmoz™ (described above).

News releases or electronic advertisements in accordance with an embodiment of the invention may also be used to communicate key information online about incipient problems or product updates. For example, a user may be provided with pre-emptive support service for a product, or be informed about updates, new releases, and enhancements to the product, as part of technical support or customer service.

In a further embodiment according to the invention, a news release or electronic advertisement formatted in accordance with an embodiment described herein is used as part of a transaction conducted partially or totally by e-mail. Microsoft's Passport and Ilium Software's eWallet are two examples of systems that provide the ability to conduct "transactive e-mail." See http://www.passport.com and http://www.iliumsoft.com/wallet.htm, the disclosures of which are hereby incorporated herein by reference. Formats described herein may be used with similar systems in order to encourage parties to jump to the next step of a transaction, by giving a party just the information that he or she needs in order to proceed to the next step. In this regard, the "Take Action" and "Feedback Now" sections of a news release format described herein are particularly useful.

In another embodiment, a news release or electronic advertisement formatted in accordance with an embodiment described herein is used as part of an online shopping agent system, such as a website that tracks a retailer's inventory and then performs customized actions, such as offering hour-delivery for local merchants.

In accordance with further embodiments according to the invention, a news release or electronic advertisement formatted in accordance with an embodiment described herein is used with any of a variety of media or methods of access and delivery. For example, such a news release may be used with a "push to talk" connection with an audio/telephonic link; or be delivered on PDA's, Palms, smart phones, or smart appliances; with a company's sponsorship of a website; in audio form, for example as customized advertisements on Internet-based radio; aggregated into an e-mail newsletter, or as part of an electronic newsletter; as part of a wireless e-mail, or otherwise electronically delivered through a wireless device (such as a PDA or phone); as part of the X-Internet or expanded Internet, which extends Internet connectivity to other interactive devices such as cell phones and television; with targeted audio advertisements on a voice mail system, which may be a system in which users listen to targeted audio advertisements in exchange for free voice mail, and may press a button on a telephone handset to request an e-mail with more information; or with variable data printing (VDP), which takes information and web-pages that are customized based on information collected online, and puts them into paper form.

In another embodiment according to the invention, a news release or electronic advertisement formatted in accordance with an embodiment described herein is used with, or as part of, a rich media or mixed media electronic message. For example, such a message may involve streaming media instead of executable files and downloads. As another example, such a message may involve rich media such as that used by T-Mail, developed by the Townsend Agency, which uses a T-Card, a rich-medial web page that can carry personalized content that includes animation, audio, video, HTML, or plain text. See http://www.etownsend.com/capabilities/inter_tmail.htm, the disclosure of which is hereby incorporated herein by reference. A news release or electronic advertisement may also be used as a component of rich media e-mail campaigns, or other rich media electronic marketing or advertising campaigns.

In a further embodiment according to the invention, a news release or electronic advertisement formatted in accordance with an embodiment described herein is delivered via an application service provider's format, for example as part of a suite of applications related to electronic marketing and customer relationship management.

In another embodiment according to the invention, such a news release or advertisement is used as part of a "permission marketing" program, similar to that found at YesMail.com, the disclosure of which is hereby incorporated herein by reference.

Figure 3B:
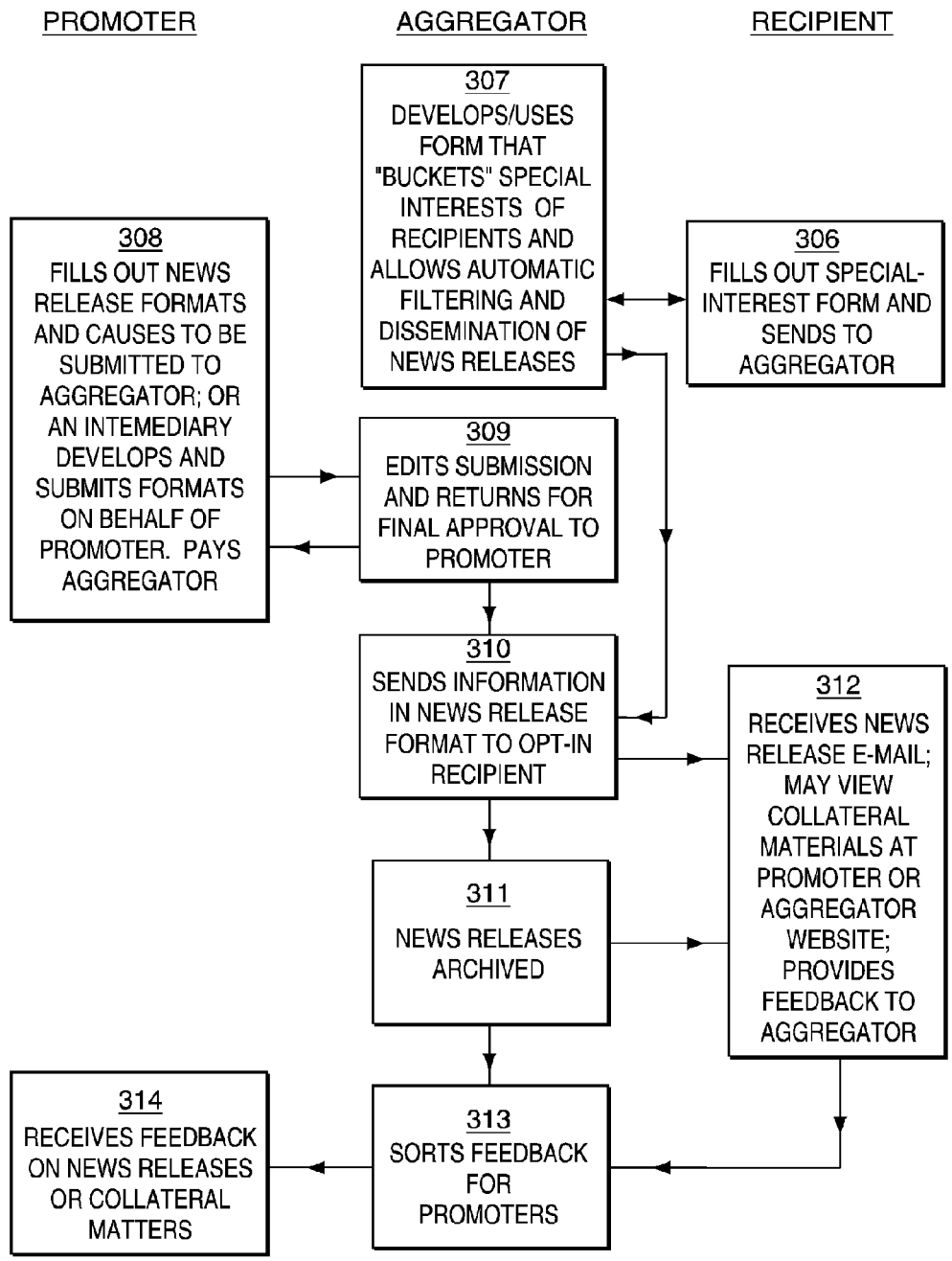
FIG. 3B is a block diagram of an embodiment of a method in accordance with the present invention for generating and distributing a news release over a network.

The structure of another embodiment of the invention is next described by reference to FIG. 3B. In this embodiment, a news release aggregator operates a host computer that distributes news releases. In box 306, a news release recipient "opts in" to receiving news releases that target his or her special interests, by filling out a special-interest form and communicating it to the aggregator. The special-interest form includes the subjects that the recipient is interested in, and the recipient's e-mail address. The special-interest form optionally may be communicated via an HTML page on a website, as a message to or from a wireless device, or as e-mail over the Internet.

In box 307, the aggregator classifies news release recipients according to their special interests, thereby enabling automatic filtering and dissemination of the news releases.

Next, in box 308, a news release promoter causes a news release format (such as the format illustrated below in connection with FIG. 27) to be filled out, submits it to the aggregator, and pays the aggregator. The promoter need not fill out and submit the form itself, but may alternatively use the services of an intermediary agency, such as an advertising agency.

The aggregator edits the promoter's submission, and returns it to the promoter (or its intermediary agent) for final approval (box 309). Once the promoter approves the news release, the aggregator retrieves the stored news release sections into a format for distribution, and distributes it to recipients who have "opted-in" to receiving news releases of that type (box 310). When the aggregator distributes the news release, the news release may also be archived by subject or other index (box 311), and the archive may be made available to recipients (for example via HTML pages on a website).

When a recipient receives a news release, he or she may be interested in obtaining further information about the release. Using information provided by the promoter in the release, the recipient may research the release further—for example, by activating a link to the promoter's website. Also, the recipient may research the news release by activating links to the aggregator's archive of news releases (box 312).

Optionally, the recipient may provide feedback on the news release (box 312). As discussed above in connection with FIG. 2A, the feedback may include a variety of recipient responses to the news release; for example, questions, comments, reviews, or return opinions about the news release or collateral matters; or about the underlying products or services discussed in the news release; or about information contained in sources cited in the news release, including that contained in websites accessible by cited hyperlinks; or about samples of the underlying products or services. Preferably, the feedback indicates the news release and/or promoter to which it responds. It may include information enabling further communication with the recipient who is the source of the feedback. In alternative preferred embodiments, the feedback is communicated to the aggregator via HTML pages on a website of the aggregator, or by activating an information link provided with the news release, or via e-mail over the internet.

Upon receiving recipients=feedback messages, the aggregator sorts them (preferably using computer sorting techniques) and provides each feedback message to the promoter for whom it was intended (boxes 313 and 314) or to the promoter's intermediary agent. Feedback is preferably provided to the promoter (or its agent) as E-mail over a network, such as the Internet.

Additionally, the aggregator may provide summary feedback to each promoter (or its agent), along with individual recipients=feedback. Generally, the summary feedback gives useful summary information to each promoter (or promoter's agent) about recipients=behavior, based on information about the recipients that is known to the aggregator. It could include, for example, the percentage of all news release recipients who provided feedback to the promoter; a profile of the special interests of recipients who provided feedback to the promoter; the number of recipients who used the "Take Action" link, or other links; the number of feedback requests to a given promoter that are requests for products; or the percentages of favorable or unfavorable feedback.

FIG. 27 provides an example of sections of a news release in accordance with an embodiment of the present invention. As can be seen in FIG. 27, these sections include the headline (called "HEADLINE"), typically up to about 10 words in length; a summary (called "IN BRIEF"), three key points (called "HIGHLIGHTS"), typically no more than about 40 words each; "SHELF LIFE", information regarding the time period during which the news release will be considered newsworthy; "TAKE ACTION," information allowing the recipient of the news release to access additional information concerning the release, or to take immediate action, including buying a product, for example by providing links to websites; "QUOTABLES," information allowing the recipient of the news release to access quotations of principals, or other persons, related to the news release; and "KEY WORDS", providing words characterizing the content of the news release, for purposes including identifying classes of recipients.

The "QUOTABLES" section may be implemented, in one example, as an HTML link to a web page containing the quotations. The quotations themselves may also be presented in the "QUOTABLES" section; or, instead, the "QUOTABLES" section may be implemented as part of the "TAKE ACTION" section.

In the "TAKE ACTION" section, a user may also be enabled to access full or partial text of an article (via, for example, an HTML link to a web page). The article may be particularly useful for journalists who wish to base their own articles on the news release. By providing access to the article in the "TAKE ACTION" section, the automated news release thus captures a feature of traditional press releases. Alternatively, the full or partial article may be useful to consumers in obtaining further information about a product described in the news release.

In addition there is a section on contact information that includes subsections providing links to relevant websites, information concerning the availability of a full press release, other available materials, and persons who may be contacted (identified as "CONTACT(S)").

For the contact information, the weblinks may be provided as simply a list of site addresses, or as hyperlinks. The other available materials may include another full news release, samples of a product, or other materials—optionally available as hyperlinks to websites, and optionally displayed in a bulleted list. The "CONTACT(S)" field may include the name of a promoter (or its intermediary agent), the promoter's (or agent's) affiliation, e-mail address, phone number, or other contact information.

The final section, "FEEDBACK NOW," provides a format for recipients to provide feedback to the promoter, or its intermediary agent, as discussed above.

It should be noted that not all information supplied by the user in connection with a contemplated news release need be utilized in the news release as distributed. For example, information in "KEY WORDS" may be used in determining classes of recipients of the news release but may be omitted from the news release itself. In FIG. 28 is provided an example of a news release utilizing the sections set forth in FIG. 27.

Figure 4A:
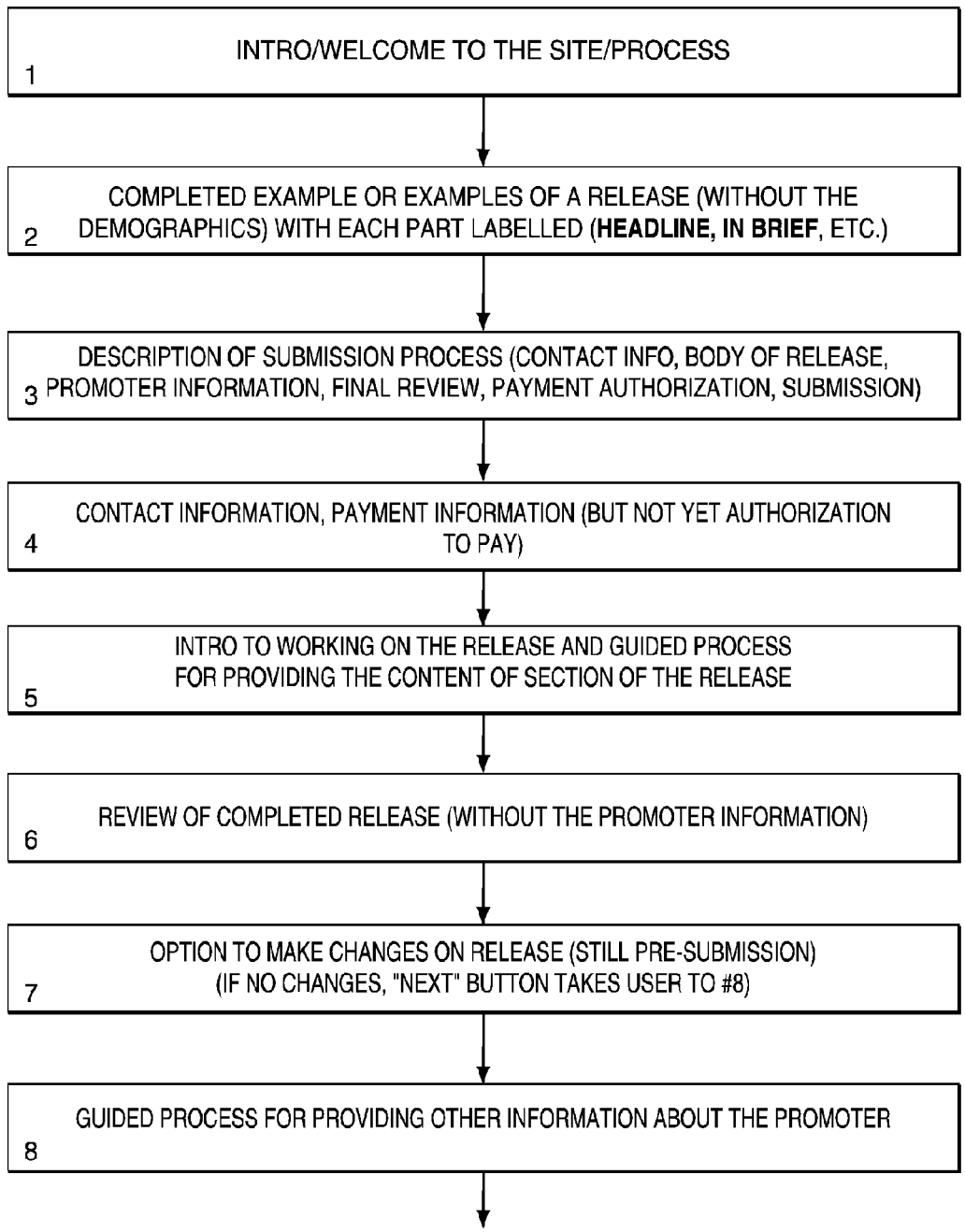
FIGS. 4A through 4C illustrate in further detail the logical flow of an embodiment similar to that of FIG. 2A.
Figure 4B:
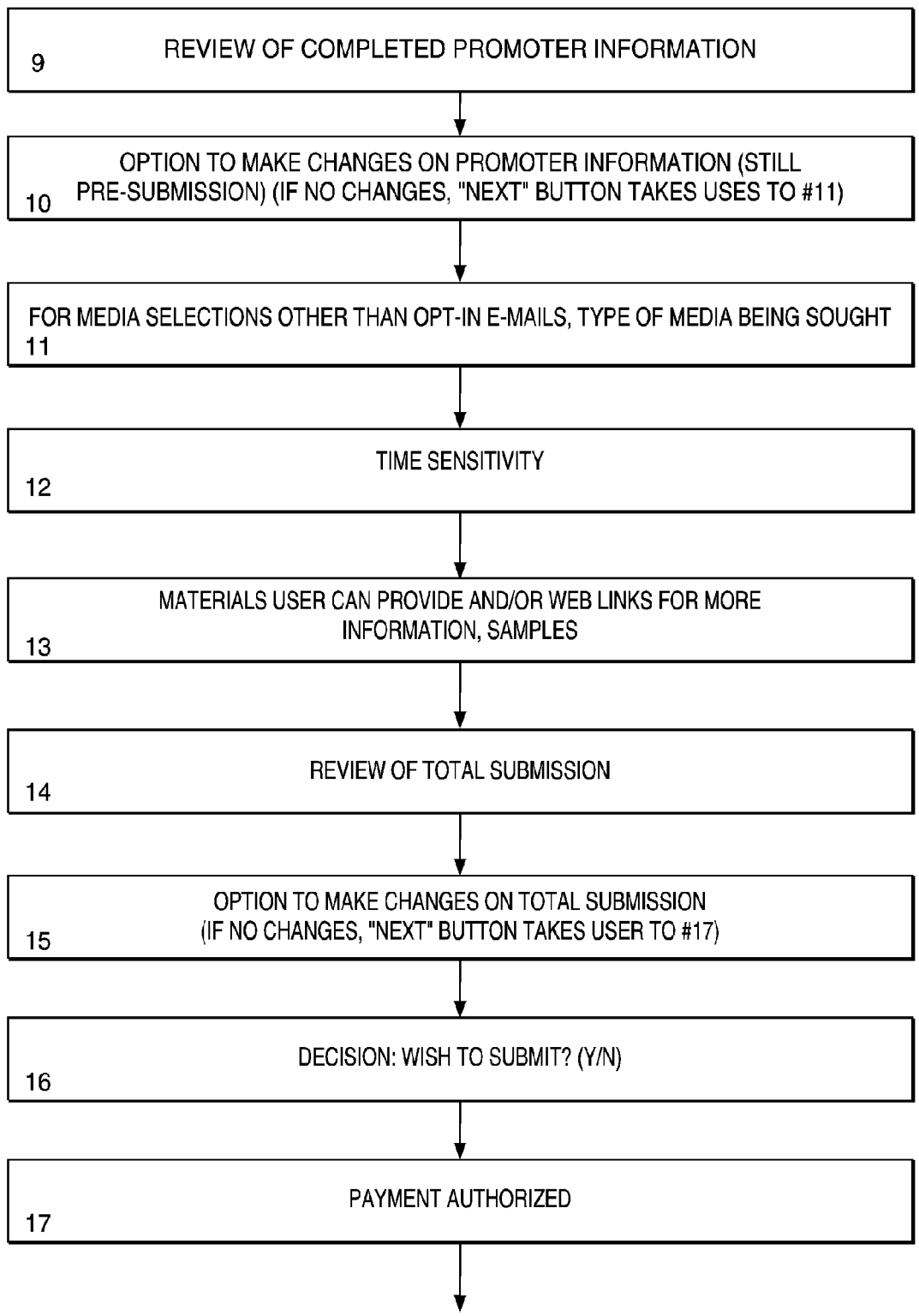
Figure 4C:
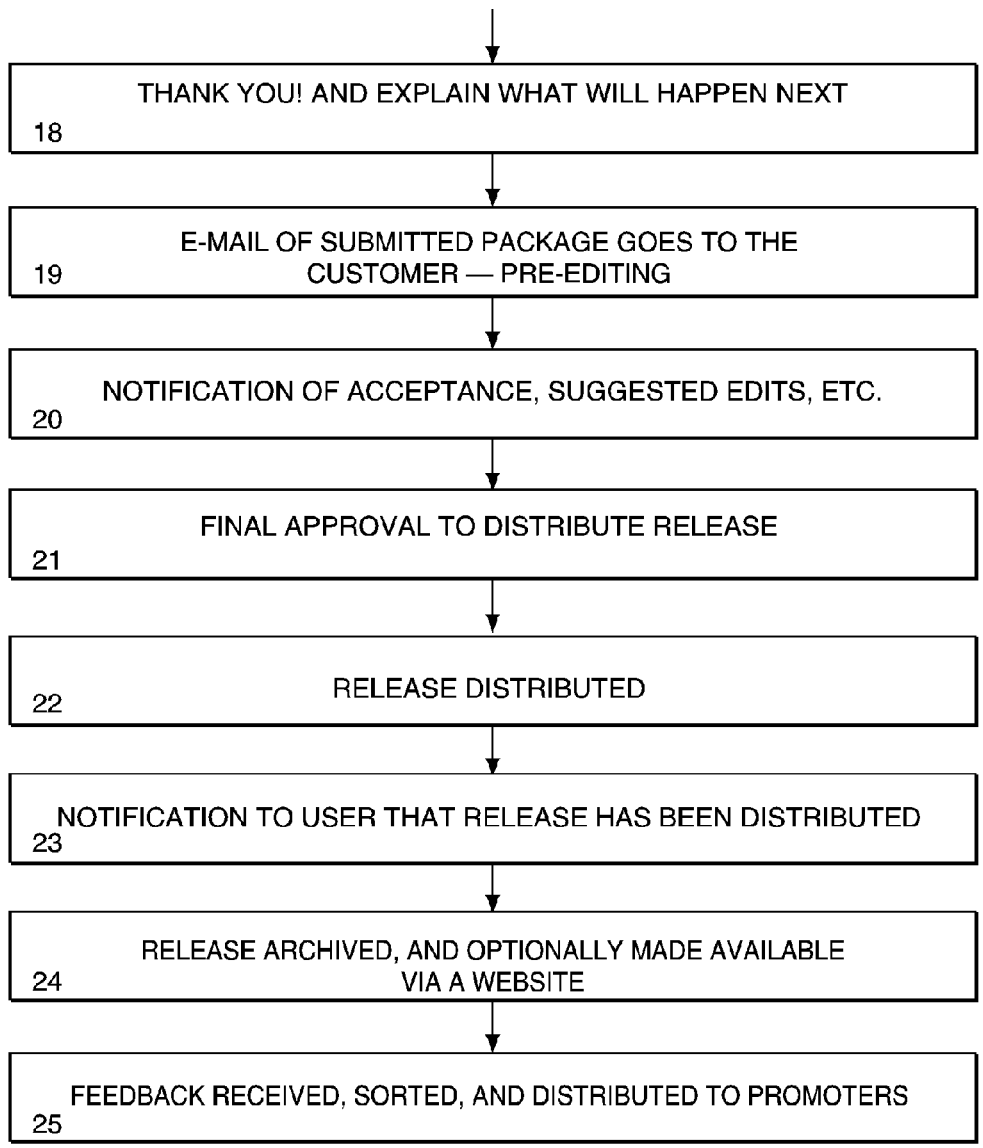

FIGS. 4A through 4C illustrate in further detail the logical flow of an embodiment similar to that of FIG. 2A. In box 1, the user, who may be the promoter of a news release, is presented with the home page of the Website. The home page offers the option of skipping various steps depending on user preference or experience. The user is next presented, however, in box 2 with an HTML page showing news release examples including labels of each part (that is, each section) of the news release. Next, in box 3, there is presented an HTML page that describes briefly the process flow experienced by the user in utilizing the Website to assemble a news release. In box 4, the user is provided an HTML page on which to present contact information and payment information. In box 5, the user is presented with an introduction to the process of working on the release and then is presented with a guided process for providing the content of each section of the release. This guided process may be implemented in a number of different ways. In a first implementation, the user provides content by completing templates that are provided on the Website in a manner described in further detail below in connection with FIGS. 5 through 9. Under another implementation, the user may be prompted to download templates, complete the information offline and then upload the content at a later time. Under yet a third implementation, the content may be provided by means of an interactive interview, wherein instructions, hints and questions are used to aid the user in providing a single response on each screen of a sequence of screens to cause the provision of content for each section. In box 6, the user is provided an opportunity to review the completed news release. In box 7, the user is given the opportunity to make changes to the content of the release. In box 8, the user is presented with a guided process to supply what we call "promoter" information, namely the name, title, address, telephone number, and e-mail address of a person to be listed as the contact on the news release, as well as additional information pertinent to the source of the news release; this contact may be the promoter itself or an intermediary agent of the promoter. (The guided process operates in a manner analogous with the process described above in connection with box 5.) Referring now to FIG. 4B, in box 9, the user is provided an opportunity to review the provided promoter information. In box 10, the user has the option to modify the promoter information. In box 11, the user is prompted to identify the types of media being targeted by the news release. In box 12, the user is prompted to supply information concerning the time sensitivity of the news release. In box 13, the user is prompted to provide additional information concerning the subject matter and/or links to appropriate websites. In box 14, the user is provided an opportunity to review the entire news release submission. In box 15, the user is given the opportunity to modify the submission. In box 16, the user is prompted to authorize submission of the news release and, if the authorization is given, then in box 17, the user is prompted to authorize the payment mechanism for the news release generation and distribution. In box 18 (FIG. 4C), the user is thanked and given an explanation and the procedures to be followed in generation and distribution of the news release. In box 19, the user is sent an e-mail of the generated news release. In boxes 20 and 21, the user provides notification of acceptance of the news release and any changes, and gives final approval to distribute the release. In box 22, the release is distributed and in box 23 the user is notified that the release has been distributed, at which time the user may also be provided with statistics associated with the distribution.

In box 24 a copy of the distributed release is archived as a data record in a digital storage medium in communication with the website server. News releases may be archived by subject, promoter, date of release, or other fields that may be useful for searching and retrieving releases. Optionally, archived releases may be made available on the website, in a format which enables users of the website to search through past releases using key word or other search techniques. Additionally, past releases may be made available over the website by hyperlinks of the title or other fields.

In box 25, feedback on news releases is received, for example as e-mail or via HTML pages on the website. The host computer sorts each feedback message according to the promoter for whom it is intended, and provides it to the promoter (or its agent). Optionally, the host computer also provides summary feedback to each promoter or agent.

FIG. 5 illustrates an HTML page that may be used as the "Welcome" page for the homepage of a website according to an embodiment of the invention. FIG. 6 illustrates an example of a news release, that may also be provided as a page on the website. FIG. 7 illustrates a web page summarizing the submission process for the website, including a summary of each field of the news release.

FIGS. 8 through 24 illustrate templates in the form of HTML pages prompting a user for input of content of the news release in the sections of contact information, payment information, headline, "in brief" summary, highlights, who will care, time sensitivity, key words, and information about further opportunities.

FIG. 8 reproduces an HTML page guiding the user in filling out contact information, and contains a link to the page of FIG. 9. FIG. 9 shows a page for filling out payment information, which has links to a page for writing a headline, and to a page which enables downloading the website's forms for completion offline.

FIG. 10 reproduces an HTML page guiding the user in creation of a headline. It can be seen that this page describes the purpose of the headline, provides guidelines for creating a headline, and includes a hyperlink to hints for writing an effective headline as well as a hyperlink to examples of ineffective and effective headlines. Finally, the page includes a location for entering the headline. The page also has links to HTML pages for creation of the "in brief" summary.

FIG. 11 is an HTML page providing hints for writing an effective headline. This page can be displayed by clicking on a hyperlink on the appropriate portion of the page concerning creation of the headline. This hints page includes links to the headline page as well as to examples of effective and ineffective headlines. FIG. 12 similarly shows a page providing examples of ineffective and effective headlines. This page also provides a link back to the page for writing a headline.

FIG. 13 shows an HTML page for the creation of the summary, like the page shown in FIG. 10. This page includes a description of the purpose of this section, guidelines for creation of this section, hyperlinks to hints and to examples of ineffective and effective renderings of the section. Finally, there is provided a region to enter the content of the section. Additionally, the page provides a link to another page for entering the highlights section of the news release.

FIG. 14 is an HTML page providing hints for writing an effective summary. This hints page includes links to the page for writing a summary as well as to examples of effective and ineffective summaries. FIG. 15 similarly shows a page providing examples of effective and ineffective summaries.

Similarly, in FIG. 16 is shown a page formatted for obtaining the content of highlights of the news release. This page also includes parts devoted to purpose and guidelines, as well as places for entry of content and links to pages shown in FIGS. 17 and 18.

FIG. 17 shows an HTML page providing hints for writing highlights, and FIG. 18 shows a page providing examples of effective and ineffective highlights.

FIGS. 19-21 similarly provide linked pages guiding the user in writing a "who will care" section of a news release, including hints for writing the section (FIG. 20) and examples (FIG. 21).

FIG. 22 is an HTML page eliciting information about the time sensitivity of a news release. Using the information submitted from this page, an aggregator of news releases can determine when to distribute each news release.

FIG. 23 is an HTML page eliciting key words which describe the news release. Using these key words, an aggregator of news releases can determine recipients to whom each release will be of special interest.

FIG. 24 is an HTML page eliciting information about opportunities for further action on a news release. These opportunities include websites, URL's for e-commerce purchases and press kits, and information about samples.

FIG. 25 shows an HTML page that allows a user to review the completed news release, authorize credit card payment, and submit the release.

FIG. 26 shows an HTML page which informs the user about the next stage in the news release process according to this embodiment of the invention, and thanks the user.

We claim:

1. A method of providing a news release to a user, the method comprising:
   providing access to the user, over a network, to data stored in a computer-readable digital storage medium, the data including content authored and uploaded separately and using a template for each news release section of a series of distinct news release sections, the sections including a headline, a summary, a set of key points, wherein each key point consists of no more than 40 words and the key points describing why the user should be interested in the content of the news release, and contact information enabling the user to obtain additional information about the provided content wherein providing access to the user includes:
   retrieving from the digital storage medium the content for each distinct news release section including the headline, the summary, the key points, and the contact information; and
   assembling the contents of the distinct news release sections retrieved from the digital storage medium into a structured news release that is provided, as a distinct and independent unit, to the user over the network so that the user experiences a news release having a plurality of distinct sections, the sections including:
   the headline;
   the summary;
   the key points; and
   the contact information.

2. The method according to claim 1, further comprising permitting selection and retrieval of the data provided to the user, according to user-specified search criteria, so that the user is able to select among a plurality of news release experiences.

3. The method according to claim 2, wherein the news release experiences include exposure to promotional information.

4. The method according to claim 1, wherein providing a news release includes providing content that has been selected, for at least one of the plurality of sections of the news release, from among a plurality of different possible choices of content for the at least one section of the news release, the selection based upon characteristics of a target audience of the news release.

5. The method according to claim 1, wherein the news release experience includes exposure to an advertisement relating to an information category identified based upon the user's previous response, over the network, to at least one other advertisement.

6. The method according to claim 1, wherein the news release is selected based upon the subject matter of a transaction that takes place in a plurality of stages among a plurality of parties, at least one of the parties being the user, and wherein the news release is provided in at least one stage of the transaction.

7. The method according to claim 6, wherein at least one of the parties is a merchant.

8. The method according to claim 1, wherein the news release experience includes exposure to promotional information and is provided to the user only upon a determination that a selected marketing tier for the promotional information is of equal or higher hierarchical marketing tier level than a predetermined level, the marketing tier for the promotional information selected from among a plurality of marketing tiers each characterized by a different hierarchical level of customization to user preferences.

9. The method according to claim 8, wherein the promotional information includes a promotional e-mail.

10. The method according to claim 1, the method further comprising:
forming a profile of a user's product preferences based upon the user's choices of products from among a plurality of product options provided to the user in the news release.

11. The method according to claim 1, the method further comprising:
forming a profile of a user's preferences for services based upon the user's choices of services from among a plurality of service options provided to the user in the news release.

12. A system for providing a news release to a user, the system comprising:
means for providing access to the user, over a network, to data stored in a computer-readable digital storage medium, the data including content authored and uploaded separately and using a template for each news release section of a series of distinct news release sections, the sections including a headline, a summary, a set of key points, wherein each key point consists of no more than 40 words and the key points describing why the user should be interested in the content of the news release, and contact information enabling the user to obtain additional information about the provided content, said means for providing access to the user including:
means for retrieving from the digital storage medium the content for each distinct news release section including the headline, the summary, the key points, and the contact information; and
means for assembling the contents of the distinct news release sections retrieved from the digital storage medium into a structured news release that is provided, as a distinct and independent unit, to the user over the network so that the user experiences a news release having a plurality of distinct sections, the sections including:
(i) the headline;
(ii) the summary;
(iii) the key points; and
(iv) the contact information.

13. The system according to claim 12, further comprising means for permitting selection and retrieval of the data provided to the user, according to user-specified search criteria, so that the user is able to select among a plurality of news release experiences.

14. The system according to claim 13, wherein the news release experiences include exposure to promotional information.

15. The system according to claim 12, wherein the means for structuring the data provided to the user includes means for providing content that has been selected, for at least one of the plurality of sections of the news release, from among a plurality of different possible choices of content for the at least one section of the news release, the selection based upon characteristics of a target audience of the news release.

16. The system according to claim 12, wherein the news release experience includes exposure to an advertisement relating to an information category identified based upon the user's previous response, over the network, to at least one other advertisement.

17. The system according to claim 12, wherein the news release is selected based upon the subject matter of a transaction that takes place in a plurality of stages among a plurality of parties, at least one of the parties being the user, and wherein the news release is provided in at least one stage of the transaction.

18. The system according to claim 17, wherein at least one of the parties is a merchant.

19. The system according to claim 12, wherein the news release experience includes exposure to promotional information and is provided to the user only upon a determination that a selected marketing tier for the promotional information is of equal or higher hierarchical marketing tier level than a predetermined level,
the marketing tier for the promotional information selected from among a plurality of marketing tiers each characterized by a different hierarchical level of customization to user preferences.

20. The system according to claim 19, wherein the promotional information includes a promotional e-mail.

21. The system according to claim 12, the system further comprising:
means for forming a profile of the user's product preferences based upon the user's choices of products from among a plurality of product options provided to the user in the news release.

22. The system according to claim 12, the system further comprising:
means for forming a profile of the user's service preferences based upon the user's choices of services from among a plurality of service options provided to the user in the news release.

* * * * *